(No Model.) 2 Sheets—Sheet 2.
W. H. COOLEY.
ELECTRIC TELEGRAPH.
No. 551,947. Patented Dec. 24, 1895.
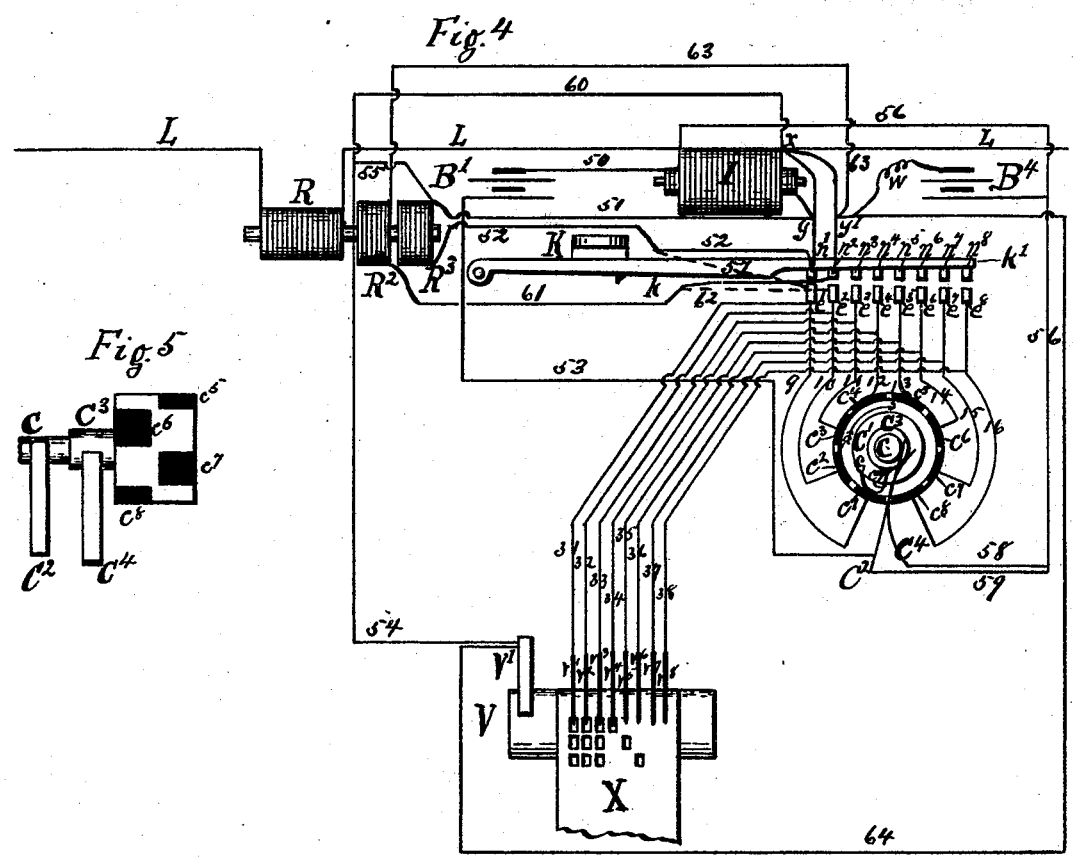
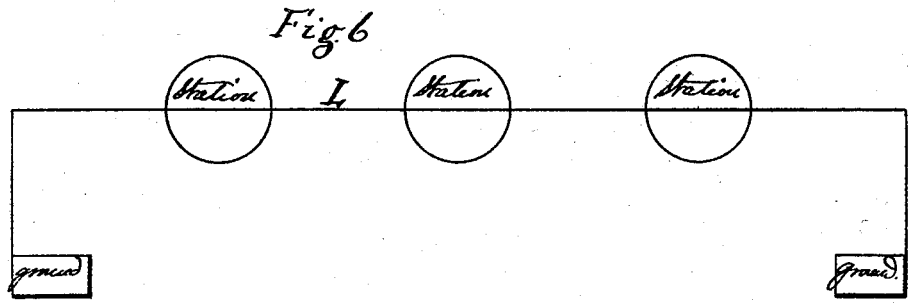

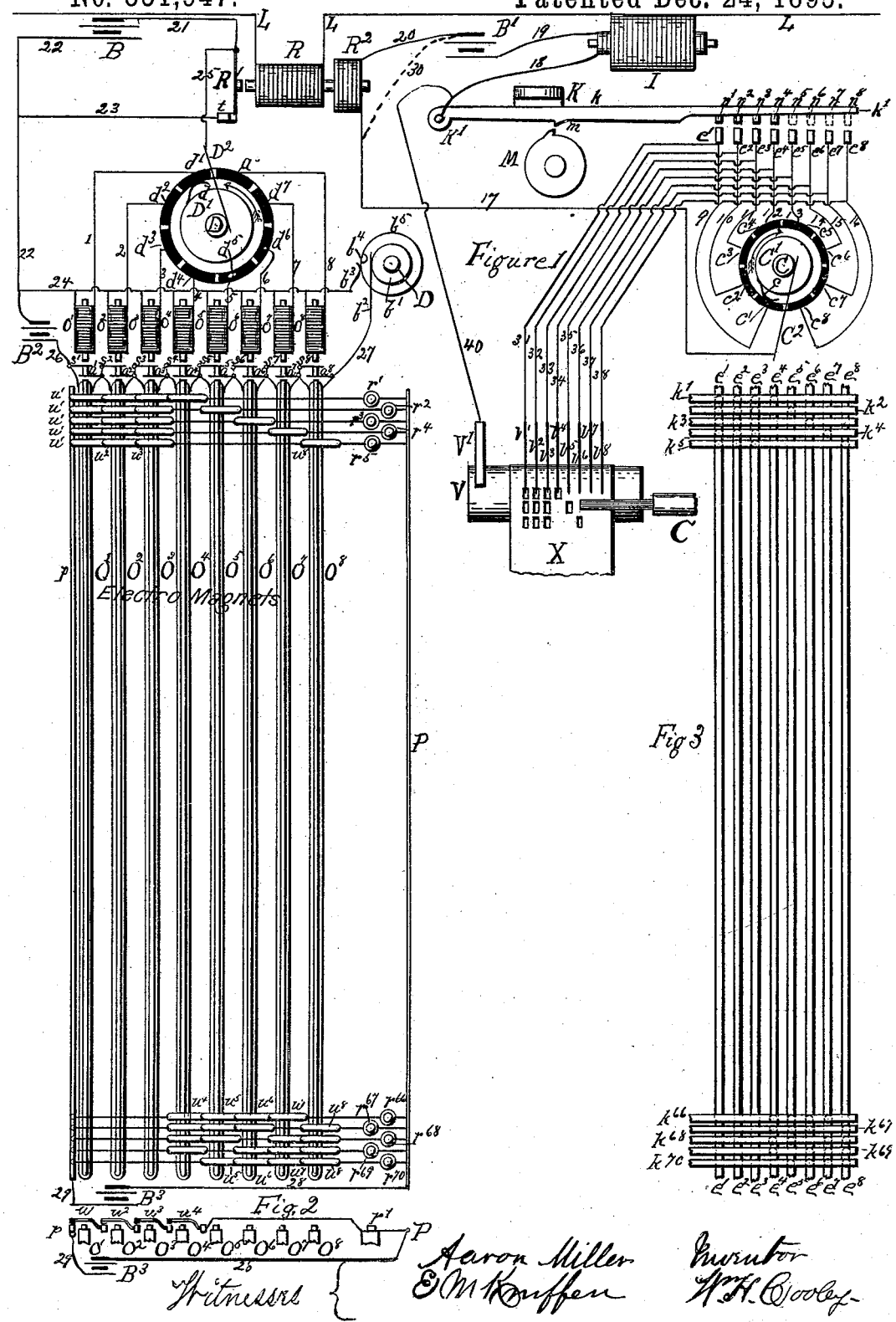

UNITED STATES PATENT OFFICE.

WILLIAM H. COOLEY, OF BROCKPORT, NEW YORK.

ELECTRIC TELEGRAPH.

SPECIFICATION forming part of Letters Patent No. 551,947, dated December 24, 1895.

Application filed March 23, 1889. Serial No. 304,755. (No model.)

*To all whom it may concern:*

Be it known that I, WILLIAM H. COOLEY, a citizen of the United States, residing at Brockport, in the county of Monroe and State of New York, have invented certain new and useful Improvements in Electric Telegraphs, of which the following is a specification.

The object of my present invention is the telegraphic operation at one station of any one of a given number of electromagnets according to the will of the operator at another distant station, and that too over a single main-line wire and by means of the least possible number of electric impulses on such main-line wire, whereby at any transmitting-station the operator, by pressing any one of a certain number of keys, can energize the corresponding electromagnet at the receiving-station. Each one of such electromagnets at the receiving-station can of course be used to actuate a different key of a type-writer or other similar instrument. Such, briefly stated, is the ulterior object of my invention—viz., the operation telegraphically of a type-writer or other similar instrument.

In the accompanying drawings I have shown only such parts of a telegraphic system and apparatus as are essential to illustrate my invention. Hence I have shown no type-writer, but simply a series of electromagnets and means for telegraphically energizing any one at will.

Synchronously revolving or moving mechanism being common in telegraphic apparatus, I have only outlined briefly such synchronously-moving parts in my present case, as they form no part of my present invention.

In carrying out my invention I make use of synchronously-revolving contact brushes or springs, bearing each one successively upon eight contact-points in each revolution. By utilizing four only of these contacts in each revolution I am enabled to make seventy different possible combinations of four of such contacts in each combination, thereby utilizing at each revolution of the contact-brush a different one of the seventy different possible combinations of four out of the eight points in the revolution of such contact-brushes. Each one of such different possible combinations of four impulses each on the main line is, by means of devices hereinafter explained, translated, and causes a separate electromagnet to be energized.

The accompanying drawings are as follows:

Figure 1 is a general plan view of my system and apparatus. Figs. 2 to 6 illustrate details of the same, as will be explained.

Similar letters and numerals refer to similar parts throughout the several figures.

Referring to the drawings, $c$ and $d$ are the transmitting and receiving contact-brushes secured respectively on wheels $C'$ and $D'$, located on shafts $C$ and $D$, and caused to revolve synchronously by means of any suitable mechanism. (Not shown.) As the operation of transmitting is alike at all stations, and also that of receiving, it will be sufficient to describe the operation of each at any one station. These contact-brush wheels $C'$ and $D'$ are caused to revolve in the direction indicated by the arrows, so that brushes $c$ and $d$ shall bear synchronously upon contact-points $c'$ and $d'$, $c^2$ and $d^2$, $c^3$ and $d^3$, &c. Wires 9 to 16, inclusive, as seen in Fig. 1, connect contact-points $c'$ $c^2$ $c^3$, and so on to $c^8$, respectively with contact-bars $e'$ $e^2$ $e^3$, and so on to $e^8$. A key K represents one of seventy different but similar keys, each having a metallic key-bar $k$, terminating in metallic key-bar fingers $k'$ $k^2$ $k^3$, and so on to $k^{70}$. Upon these key-bar fingers $k'$ $k^2$ $k^3$ $k^4$, &c., are secured the key-contacts $n'$ $n^2$ $n^3$, &c., to $n^8$, four being indicated in dotted lines in Fig. 1 and four being shown in full lines, because there are only four of such key-contacts $n'$ $n^2$ $n^3$, &c., located on each of these key-bar fingers $k'$ $k^2$ $k^3$, &c., to $k^{70}$. Each one of these key-bar fingers $k'$ $k^2$ $k^3$, &c., to $k^{70}$ has its key-contacts $n'$ $n^2$ $n^3$, &c., thereon, four on each, arranged according to a different one of the seventy possible combinations of the eight contacts taken four at a time—viz., 1 2 3 4, 1 2 3 5, 1 2 3 6, 1 2 3 7, 1 2 3 8, &c. Fig. 3 shows in plan view these contact-bars $e'$ to $e^8$, with the key-bar fingers of five of the keys K at both ends of the transmitting-keyboard. The key-contacts $n'$ $n^2$ $n^3$, &c., located on the under side of the key-bar fingers $k'$ to $k^{70}$, are not seen; but their position is sufficiently indicated in dotted lines, there being four of them, as shown, secured to the under side of each key-bar finger.

In transmitting by any one key such key should be depressed and remain so through the entire revolution of wheel C', when upon being released it may be raised by means of any suitable spring, (not shown;) but as it is important that each key should be raised at the completion of each revolution of the wheel C', I make use of a cam-wheel M, having a projection thereon arranged to engage similar projections $m$, one formed on the under face of each key-bar $k$, and that too at a point in time while the contact-brushes $c$ and $d$ are passing over the blank spaces respectively between contacts $c^8$ and $c'$ and $d^8$ and $d'$. For this purpose it is only necessary that wheel M should be arranged to revolve synchronously with wheels C' and D'.

Pressing upon shaft C is seen a spring $C^2$, connected by means of wire 17 and wire 30 (indicated in dotted lines) with one terminal of battery B', the other terminal of which is connected by wire 19 with one end of the primary of inductorium I, while wire 18 connects its other end with metallic fulcrum-rod K' of the key K. All these transmitting-keys articulate upon the common metallic fulcrum-rod K' and make electric contact therewith.

Located in the circuit of the main-line wire L there is at each station a main relay R and an inductorium I. The main-line wire L, passing uninterrupted from station to station, is put to ground with a permanent or uninterrupted earth-contact at each extreme end only of the line, as seen in Fig. 6. Hence by the depression of any one of keys K electric impulses are sent to line, energizing relay R four times during a revolution of contact-wheels C' and D'. The depression of each key K causes relay R to be energized in a different combination of four out of the eight possible points during the revolution of the contact-brush wheels C' and D'.

Relay R has spring-armature R' normally resting upon a contact $t$, whereby the circuit of battery B is completed through wires 22 23, contact $t$, spring-armature R', and wire 21, when relay R is passive. Wire 22 is connected with wire 24. Wire 24, as seen, is connected with one terminal of the coils to each of sub-relays $o'$ to $o^8$, while the other terminals of the coils of sub-relays $o'$ to $o^8$ are connected respectively to the contacts $d'$ to $d^8$ by means of wires 1 to 8 respectively. Spring $D^2$ presses upon shaft D, and is connected by means of wire 25 with the fixed end of armature R', the same as also is wire 21. In the manner already described relay R is energized only at such points of time in the revolution of wheel D' as when brush $d$ bears upon some one of the contact-points $d'$ to $d^8$, and at four only of such points in time during each revolution of such wheel D', whereby the shunt of battery B, through spring-armature R', contact $t$, and wire 23, is broken during each revolution of wheel D' by the depression of one of the keys K at a transmitting-station, energizing relay R in the manner described, causing the current of battery B to energize four of the sub-relays $o'$ to $o^8$, each being caused to be energized during something over one-sixteenth of a revolution of wheel D'—that is, while the contact brush or spring $d$ bears against one of the contact-points $d'$ to $d^8$—each forming one of the terminals for the coils of sub-relays $o'$ to $o^8$. Sub-relays $o'$ to $o^8$ have respectively spring-armatures $s'$ to $s^8$, and these armatures $s'$ to $s^8$ bear normally against contacts, which the space on the drawings does not admit of lettering. These same contacts are also common to spring-armatures $a'$ to $a^8$. The fixed ends of armatures $a'$ and $s^2$ are connected together, as seen; also, $a^2$ and $s^3$, $a^3$ and $s^4$, $a^4$ and $s^5$, $a^5$ and $s^6$, $a^6$ and $s^7$, $a^7$ and $s^8$, while the fixed end of armature $a^8$ is connected by means of wire 27 with metallic spring $b^2$ bearing upon metallic wheel $b'$ on shaft D and making an electric connection with metallic wheel $b^5$, on which bears metallic spring $b^3$, connected by means of wires 24 and 22 with one terminal of battery $B^2$, the other terminal of which is connected by means of wire 26 with the fixed end of spring-armature $s'$, to which is also secured the inner terminal of the coil of electromagnet O'. The outer terminal of the coil of this electromagnet O' is secured, in common with the inner terminal of coil of electromagnet $O^2$, to the fixed end of spring-armature $a'$, and so on, these electromagnets O' to $O^8$ having their coils connected together in series by having the outer terminal of one and the inner terminal of the next succeeding one respectively connected to the fixed ends of the spring-armatures $a'$ to $a^7$, while the outer terminal of the coil of electromagnet $O^8$ is secured to the fixed end of spring-armature $a^8$. These electromagnets O' to $O^8$ are seen in plan view, and consist of thin plates of soft iron, wound with coils of insulated wire in the usual manner to produce electromagnets, and have their cores laterally extended at their upper ends and on the edges toward the spring-armatures $a'$ to $a^8$, so as to actuate such armatures $a'$ to $a^8$ when such electromagnets O' to $O^8$ are energized in the manner to be explained, which is as follows:

The normal circuit of battery $B^2$, when no one of the sub-relays $o'$ to $o^8$ is energized, is as follows: through wires 22 and 24, spring $b^3$, wheel $b^5$, wheel $b'$, spring $b^2$, wire 27, and then in succession spring-armatures $a^8$ $s^8$, $a^7$ $s^7$, $a^6$ $s^6$, and so on to $a'$ and $s'$, and back through wire 26 to battery $B^2$; but supposing any one of these sub-relays $o'$ to $o^8$ to be energized in the manner described—as, for instance, sub-relay $o'$. When sub-relay $o'$ is energized armature $s'$ is attracted, thereby breaking the shunt between the spring-armatures $a'$ and $s'$ and causing the current of battery $B^2$ to traverse the coil of electromagnet O', immediately thereupon causing it to attract its armature $a'$, permanently breaking the shunt between armatures $a'$ and $s'$. This is necessary, because sub-relay $o'$ is energized but momentarily, so that spring-armature $s'$ instantly returns to its normal position against the common shunt-contact between it and spring-armature $a'$; but before this takes place electromagnet $O'$ has been energized and its spring-armature $a'$ withdrawn from this same shunt-contact, so that the return of spring-armature $s'$ to its normal position does not effect a reshunting of electromagnet $O'$ from the circuit of battery $B^2$; but such electromagnet $O'$ remains in the circuit of battery $B^2$, retaining its magnetism until the circuit of such battery $B^2$ is broken in the manner to be described. In the same manner the energizing of each one of the sub-relays $o'$ to $o^8$ causes its corresponding electromagnet $O'$ to $O^8$ to be thrown into the circuit of battery $B^2$ and to remain therein and to be energized therefrom until the circuit of such battery $B^2$ is broken in the following manner, viz: Wheel $b^5$ has secured in its periphery a small insulating-segment $b^4$, and this wheel $b^5$ is revolved, by means of its being located on shaft D, as shown, synchronously with wheel $D'$, with this insulating-segment $b^4$ so located in the periphery of wheel $b^5$ that it shall pass under spring $b^3$ while contact-brush $d$ on wheel $D'$ is passing over the blank space between contact-points $d^8$ and $d'$, thereby breaking the circuit of battery $B^2$ and de-energizing such of electromagnets $O'$ to $O^8$ as at that time happen to be in the circuit of battery $B^2$ and restoring the normal shunt of electromagnets $O'$ to $O^8$, and thus restoring the apparatus to its normal position, in readiness for the next revolution of wheel $D'$. Hence the depression of any one of the keys K at a transmitting-station causes four of the electromagnets $O'$ to $O^8$ at a receiving-station to be energized. Electromagnets $O'$ to $O^8$, respectively, it will be readily seen, are each energized only by the depression at a transmitting-station of keys K, having located upon their key-bar fingers key-contacts $n'$ to $n^8$; but there being seventy different keys, as described, having four key-contacts arranged differently on each, these eight electromagnets $O'$ to $O^8$ will be, by the depression of the seventy different transmitting-keys, energized in seventy different possible combinations of four each at a revolution of the contact-brush. It only remains now to describe how each of these seventy different possible combinations causes a different signaling, registering or printing electromagnet to be energized. This I accomplish as follows: Over these electromagnets $O'$ to $O^8$ I arrange, so as to be actuated therefrom, two hundred and eighty spring-armatures $u'$ to $u^8$, located in seventy rows, with four in each row, so that when attracted by their corresponding electromagnets $O'$ to $O^8$ they shall be connected together in series with the coils of printing or registering electromagnets $r'$, $r^2$, $r^3$, $r^4$, and so on to $r^{70}$, and between metallic rods $p$ and P. Referring to Figs. 1 and 2, Fig. 2 shows the upper ends of these electromagnets $O'$ to $O^8$, and four of them—viz., $O'$, $O^2$, $O^3$, and $O^4$—having spring-armatures $u'$, $u^2$, $u^3$, and $u^4$, respectively, over them, and also the battery and circuit connections necessary for operating a printing-electromagnet $r'$ when a transmitting-key having key-contacts $n'$, $n^2$, $n^3$, and $n^4$ is depressed. This rod $p$ forms the contacts against which all of these spring-armatures $u'$, over and actuated from electromagnets $O'$, are caused to bear by the attraction of magnet $O'$. The fixed ends of spring-armatures $u'$ form or are secured to the contacts for such spring-armatures $u^2$ as lie in the same row therewith. In the same way the fixed ends of the spring-armatures $u^2$ form contacts for such spring-armatures $u^3$ as lie in the same row therewith, and so on throughout the series. In any row where these spring-armatures $u'$, $u^2$, $u^3$, &c., do not immediately follow each other the fixed end of one such spring-armature is connected, as indicated, with the contact of the next one that does come in order in that row; and also in any one row where a spring-armature $u'$ is missing connection is made between rod $p$ and the contact under the first one of such spring-armatures that does appear. It will also be noticed that connection is made between the fixed end of the last spring-armature that does appear in any row and the rod P through the coil of some one of the printing-electromagnets $r'$ to $r^{70}$. The contacts under these spring-armatures $u'$ to $u^8$, being concealed under such spring-armatures, are not seen in the drawings; but their location and function and the circuit connections are clearly illustrated. Battery $B^3$, by means of wires 28 and 29, has its terminals respectively formed in rods P and $p$. Hence it will be seen that when electromagnets $O'$, $O^2$, $O^3$ and $O^4$ are energized by the depression of a transmitting-key having key-contacts $n'$, $n^2$, $n^3$ and $n^4$ thereon, as there is only one row in which these spring-armatures $u'$, $u^2$, $u^3$ and $u^4$ appear, the current of battery $B^3$ can be completed only through that row and the coil of printing-electromagnet $r'$ located therein, thus energizing such printing-electromagnet $r'$. In the same manner printing-electromagnet $r^2$ can be energized only by the depression of the transmitting-key having key-contacts $n'$, $n^2$, $n^3$ and $n^5$ thereon, and printing-magnet $r^3$ only by the depression of the key having key-contacts $n'$, $n^2$, $n^3$ and $n^6$ thereon, and so on throughout the seventy different printing-electromagnets, each can be actuated only by the depression of its corresponding key at the transmitting-station.

Automatic and rapid transmission may be effected in this system by means of a band or fillet of paper, having perforations therein corresponding in their position and combination with the key-bar contacts $n'$ to $n^8$, secured on the under side of key-bar fingers $k'$ to $k^{70}$. Small wire springs $v'$ to $v^8$, respectively, by means of wires 31 to 38, are connected with wires 9 to 16. Such springs $v'$ to $v^8$ are arranged to bear upon a band or fillet of paper X, which may be caused, by means of a constant-pressure contact with an elongation of shaft C, as shown, to pass continuously and with uniform speed between such shaft C and a metallic roller V, having in electric contact therewith the metallic spring V', connected by means of wire 40 with wire 18. This band or fillet X has perforations therethrough, arranged in lateral rows, four in each row, so located as to pass under the spring-wires $v'$ to $v^8$. These perforations through the band or fillet X are so arranged in their position and combination as to bear the same relation to such spring-wires $v'$ to $v^8$ that the key-contacts on the key-bar fingers $k'$ to $k^{70}$ bear to the contact-bars $e'$ $e^8$. Hence there will be seventy different combinations of four perforations each. Again, the perforations in this band or fillet X are so proportioned in length that in the passage of such fillet X over such roller V such of the springs $v'$ to $v^8$ as have openings or perforations opposite them shall remain in contact with roller V during a little less than one entire revolution of wheel C'. The speed of this band or fillet X should be such, as indicated, as to cause a different row of perforations, or a longitudinal space of fillet X equivalent thereto, to pass over the roller V for each revolution of shaft C, whereby it will be seen that without using the keys K transmission may be effected in substantially the same manner by this fillet X, with perforations therein, in combination with roller V and spring-wires $v'$ to $v^8$, which, it will be seen, perform substantially the same functions as key-bar fingers $k'$ to $k^{70}$, with key-contacts $n'$ to $n^8$ thereon, in combination with contact-bars $e'$ to $e^8$.

In order that over the same wire and for each revolution of the contact-brush wheels a transmission in the manner already described may be effected in opposite directions, I make use of a balancing-coil $R^2$, adjustably located with regard to the core of relay R. Such balancing-coil $R^2$ should be so proportioned in its resistance relative to that of the coil of relay R, and should be also so adjusted in position relative to the core of relay R that when connections are made, such as are indicated by wire 20 connected with one terminal of coil $R^2$, wire 17 being connected directly with the other terminal thereof, and wire 30 (indicated in dotted lines) dispensed with, the induced current from inductorium I upon relay R, located at the same station, shall be exactly balanced in effect upon the core of relay R by the current from battery B' traversing coil $R^2$, whereby it will be seen that the influence of the transmitting apparatus at any one station upon the receiving-relay at that same station is balanced, leaving such receiving-relay free to respond to impulses sent to line from a distant station. It will of course be readily seen and understood that these sub-relays $o'$ to $o^8$ can be energized directly by or from the main-line impulses, proper connections being made therefor; but the arrangement shown is in many ways preferable, in that it admits readily of keeping the main-line circuit intact and unbroken at all times.

As indicated by the lettering, wheels $b'$ and $b^5$ are secured on the same shaft D with wheel D', and roller V is driven from the same shaft C to wheel C'; but they are shown in the drawings as detached portions of such shafts for the sake of more clearly showing the circuit connections, &c., made with each and to avoid confusion.

Very obviously without departing from the spirit of my invention many modifications may be made therein both in general arrangements and in details. One of such changes in particular I will mention, viz: Direct impulses from inductorium I may be used for impulses 1 3 5 7, and the inverse impulses succeeding each direct impulse may be used for impulses 2 4 6 8. For this purpose it is necessary that contacts $n'$ $n^2$, &c., to $n^8$ at a transmitting-station should be arranged to retain in main-line circuit or shunt out therefrom the secondary of inductorium I, according as impulses 1 2 3 4 5 6 7 8 are or are not to be sent. In this case to operate any typewriter key only requires the time necessary to charge the main line four times. The circuit connections and other necessary changes for transmission in this manner are fully illustrated in Figs. 4 and 5 and briefly described as follows: In this case I arrange the contacts $c'$ $c^3$ $c^5$ $c^7$ in one circle and the contacts $c^2$, $c^4$, $c^6$, and $c^8$ in another circle, as seen in side view in Fig. 5. Upon the contacts $c'$ $c^3$ $c^5$ $c^7$ contact spring or brush $c$ is arranged to bear in the manner already described, while another spring or brush $c^9$ is arranged to bear upon the contacts $c^2$, $c^4$, $c^6$, and $c^8$. This spring $c^9$ is connected electrically with a metallic ferrule $C^3$, secured upon but insulated from shaft C, and having metallic spring $C^4$ bearing thereon. In tracing the circuits in transmission in this manner I shall only trace them in the four possible cases in connection with impulses 1 and 2—i. e., when each of such impulses is sent and when each of such impulses is not sent.

It will of course be understood that exactly similar circuit connections, and exactly similar descriptions thereof, will apply in the case of impulses 3 and 4, 5 and 6, and 7 and 8. Hence I describe them only in relation to impulses 1 and 2. It will also of course be understood that whether impulses 1 3 5 7 are sent to line or not the current of battery B' must traverse the primary of inductorium I in just the same way and at just the same points of time as would occur if such impulses 1 3 5 7 were to be sent. In transmission in this manner by means of keys, such as K, each of the key-contacts $n'$ $n^2$, &c., to $n^8$ thereon should be insulated from all the others.

Referring to Figs. 4 and 5, and supposing impulse 1 to be sent to line, and a key K to be depressed, having key-contact $n'$ thereon, the current of battery B' takes the following course, viz: wire 50, primary of inductorium I, thence to point $y$, connection $x$ $y$ being omitted and wire 51 terminating at point $y$, thence through wire 51 to coil $R^3$, wire 55 being omitted, thence through coil $R^3$ and wire 52 to key-contact $n'$, thence (key K of course being depressed) to contact-bar $e'$, wire 9, contact $c'$, spring $c$, shaft C, spring $C^2$, thence by wire 53 back to battery $B'$; but, supposing impulse 1 is not to be sent, connect point $x$, which is one terminal of the secondary of inductorium I, with point $y$, and connect point $y$ with key-contact $n'$. Then the current of battery $B'$ takes exactly the same course, except that by means of the connection between point $y$ and key-contact $n'$, coil $R^3$ is shunted out of such circuit, and at the same time also the secondary of inductorium I is shunted from main-line circuit, the impulse induced therein being caused to take the following course, viz: from point $x$ to point $y$, then to key-contact $n'$, contact-bar $e'$, wire 9, contact $c'$, spring $c$, shaft C, spring $C^2$, and wires 59 and 56 back to other terminal of secondary of inductorium I. Again, omit the connection indicated between point $x$ and point $y'$ and point $y'$ and key-contact $n^2$, and supposing impulse 2 to be sent. By means of wire 63 connection is made, as indicated, between coil $R^2$ and battery $B^4$ through an adjustable resistance $w$, while wire 61 makes connection between the other terminal of coil $R^2$ and the key-contact $n^2$. Then the current of battery $B^4$ is caused to take the following course, viz: resistance $w$, wire 63, coil $R^2$, wire 61, contact $n^2$, contact-bar $e^2$, wire 10, contact $c^2$, spring $c^9$, which of course at this time will bear upon contact $c^2$, ferrule $C^3$, spring $C^4$, and wires 58 and 56 back to battery $B^4$; but supposing impulse 2 is not to be sent, connection is made, as indicated, between point $x$, point $y'$, and key-contact $n^2$. In this case the secondary impulse from inductorium I is shunted from the main line and caused to take the following course, viz: from point $x$ to key-contact $n^2$, contact-bar $e^2$, wire 10, contact $c^2$, spring $c^9$, now in contact therewith, ferrule $C^3$, spring $C^4$, and wires 58 and 56 back to the other terminal of secondary of inductorium I.

For automatic transmission from the band or fillet X, in which case perforations are made in such band or fillet X only when impulses are not to be sent to line, bearing this in mind, the circuits are as follows, viz: first, omitting the connection between point $x$, point $y$, and key-contact $n'$; and also between point $x$ and point $y'$ and contact $n^2$, and making connection such as indicated by wires 55 and 64 and by wire 57, (indicated in dotted lines,) connecting wire 52 with contact-bar $e'$, and also by wire 62, (also indicated in dotted lines,) connecting wire 61 with contact-bar $e^2$, and supposing impulse 1 is to be sent, then the circuit of battery $B'$ will be caused to take substantially the same course as by key-transmission, except that by means of wire 57 a portion of the wire 52 and key-contact $n'$ are shunted out. Again, supposing impulse 1 is not to be sent, in this case a perforation in the band or fillet X appears in the first longitudinal row thereof at the left hand, whereby spring $v'$ makes electric contact with roller V, causing the current of battery $B'$ to take the following course, viz: wire 50, primary of inductorium I to point $y$, wires 51 55 54, spring $V'$, roller V, spring $v'$, wire 31, contact-bar $e'$, wire 9, contact $c'$, spring $c$, shaft C, spring $C^2$, and wire 53 back to battery $B'$, while impulse 1 from the secondary of inductorium I is shunted from the main-line circuit and caused to take the following course, viz: from point $x$, through wires 60 and 54, spring $V'$, roller V, spring $v'$, wire 31, contact-bar $e'$, wire 9, contact $c'$, spring $c$, shaft C, spring $C^2$, wires 59 and 56 back to secondary of inductorium I. Supposing impulse 2 is to be sent, then the current of such battery $B^4$ (there being no perforation in the band or fillet of paper X under spring $v^2$ and corresponding to contact $c^2$) will be caused to traverse the same course substantially as already described in key-transmission, except that a portion of wire 61 and key-contact $n^2$ are shunted out by means of wire 62 making connection with contact-bar $e^2$. Again, supposing impulse 2 is not to be sent to line, then the current of battery $B^4$ is shunted out from coil $R^2$ and caused to take the following course, viz: through resistance $w$ to point $y'$, thence through wire 64 to spring $V'$, roller V, and through the perforation in the band or fillet X, (which appears in this case corresponding with contact $c^2$,) spring $v^2$, wire 32, contact-bar $e^2$, wire 10, contact $c^2$, spring $c^9$, now in contact therewith, ferrule $C^3$, spring $C^4$, and wires 58 and 56 back to battery $B^4$, while impulse 2 from the secondary of inductorium I is shunted from the main-line circuit and caused to take the following course, viz: from point $x$ through wires 60 and 54 to spring $V'$, roller V, spring $v^2$, wire 32, contact-bar $e^2$, wire 10, contact $c^2$, spring $c^9$, now in contact therewith, ferrule $C^3$, spring $C^4$, and wires 58 and 56 back to the other terminal of the secondary of inductorium I.

In the manner and by the circuit connections just described it will be seen that both the charge and discharge of the main-line wire by direct and inverse impulses are utilized to actuate a receiving-relay, while the effect of such direct and inverse impulses is at all times balanced on the home relay.

I would further call attention to the fact that, by my present system and apparatus herein shown and described, as during each revolution of the contact wheels or brushes any desired one of eight separate electromagnets may be energized in the time required to send four impulses to line—i. e., to charge and discharge the line four times—and that as the impulse sent to line from any station is always balanced on the home relay at that same station sixteen messages may be sent simultaneously over the same line-wire by that modification of the ordinary Morse system which consists in forming all the characters from dots—i. e., forming dashes by a continuation or series of dots. Such messages may of course all be sent between the same or different stations.

I have shown one particular way only for producing charges on the main line in different combinations of the points of time made by a distributer or other synchronously-moving mechanism, but of course any other method producing equivalent results can be used. It will be seen at once that my system, owing to the peculiar arrangement and combination of receiving elements, readily lends itself to any method of multiple telegraphy. That particular phase of my present invention and means for carrying out the same, herein shown and described, were selected on account of their simplicity and the opportunity afforded thereby to give perspicuity to the more essential features, but obviously very many changes and modifications may be made entirely within the spirit of my invention.

I have shown an unbroken main-line circuit. I do not limit myself to this construction however.

Many features of my present invention are applicable to telegraphs in general, as well as to my system herein shown.

It will of course be understood that in the use of balancing-coils in the manner herein described the battery-impulses should be only momentary and should cease at the same time with the secondary impulses induced thereby.

What I claim is—

1. In a telegraphic circuit, a main line wire, an inductorium and a relay or other receiving instrument located in such main line circuit and at the same station, in combination with a balancing coil on such relay and a transmitting instrument located together with the primary coil of such inductorium in circuit with a source of electric energy.

2. In a telegraphic circuit, a main line wire, an inductorium and a relay or other receiving instrument located in such main line circuit and at the same station, in combination with a balancing coil on such relay, a transmitting instrument and a distributer located together with the primary coil of such inductorium in circuit with a source of electric energy.

3. In a telegraphic circuit, a main line wire an inductorium and a relay or other receiving instrument located in such main line circuit and at the same station, in combination with a balancing coil on such relay, a transmitting instrument and a distributer located together with the primary coil of such inductorium in circuit with a source of electric energy, such balancing coil, such source of electric energy and the secondary coil of such inductorium all contained also in a shunt circuit, normally open, but having a separate branch for each contact of such distributer, each of such branches also normally open but containing and closed only through contacts on or controlled by any suitable transmitter.

4. In a telegraphic circuit a main line wire an inductorium and a relay or other receiving instrument located in such main line circuit and at the same station, in combination with a balancing coil on such relay a, transmitting instrument and a distributer located together with the primary coil of such inductorium in circuit with a source of electric energy, such balancing coil contained also in a shunt circuit, normally open, but having a separate branch for each contact of such distributer, each of such branches also normally open but containing and closed only through contacts on or controlled by any suitable transmitter.

5. In a telegraphic circuit, a main line wire an inductorium and a relay or other receiving instrument located in such main line circuit and at the same station, in combination with a balancing coil on such relay, a transmitting instrument and a distributer located together with the primary coil of such inductorium in circuit with a source of electric energy, such source of electric energy contained also in a shunt circuit, normally open but having a separate branch for each contact of such distributer, each of such branches also normally open but containing and closed only through contacts on or controlled by any suitable transmitter.

6. In a telegraphic circuit a main line wire an inductorium and a relay or other receiving instrument located in such main line circuit and at the same station, in combination with a balancing coil or such relay a transmitting instrument and a distributer located together with the primary coil of such inductorium in circuit with a source of electric energy, the secondary coil of such inductorium contained also in a shunt circuit formed on the main line around such inductorium, normally open, but having a separate branch for each contact of such distributer, each of such branches also normally open but containing and closed only through contacts on or controlled by any suitable transmitter.

7. In a telegraphic circuit, a main line wire, an inductorium and a relay or other receiving instrument located in such main line wire and at the same station together with a distributer, in combination with a balancing coil or coils on such relay, the source or sources of electric energy energizing such balancing coil or coils and the secondary coil of such inductorium contained in a shunt circuit normally open, but having a separate branch for each contact of such distributer, each of such branches also normally open but containing and closed only through contacts on or controlled by any suitable transmitter, the energizing circuit of such balancing coil or coils also containing contacts located on or controlled by such transmitter.

8. In a telegraphic circuit a main line wire an inductorium and a relay or other receiving instrument located in such main line wire and at the same station together with a distributer, in combination with a balancing coil or coils on such relay the source or sources of electric energy energizing such balancing coil or coils contained in a shunt circuit normally open but having a separate branch for each contact of such distributer, each of such branches also normally open but containing and closed only through contacts on or controlled by any suitable transmitter, the energizing circuit of such balancing coil or coils also containing contacts located on or controlled by such transmitter.

9. In a telegraphic circuit a main line wire an inductorium and a relay or other receiving instrument located in such main line wire and at the same station together with a distributer, in combination with a balancing coil or coils on such relay, the secondary coil of such inductorium contained in a shunt circuit formed on the main line around such inductorium normally open but having a separate branch for each contact of such distributer, each of such branches also normally open but containing and closed only through contacts on or controlled by any suitable transmitter, the energizing circuit of such balancing coil or coils also containing contacts located on or controlled by such transmitter.

10. In a telegraphic circuit, a main line wire, an inductorium and a relay or other receiving instrument located in such main line wire and at the same station together with a distributer, in combination with a balancing coil or coils on such relay, the source or sources of electric energy energizing such balancing coil or coils and the secondary coil of such inductorium contained in a shunt circuit, normally open, but having a separate branch for each contact of such distributer, each of such branches also normally open but containing and closed only through contacts on or controlled by any suitable transmitter, the energizing circuit of such balancing coil or coils also containing contacts located on or controlled by such transmitter, the primary circuit of such inductorium closed at every other contact and opened at every intermediate contact of such distributer, whereby positive and negative induced currents are sent to line alternating at the successive contacts of such distributer.

11. In a telegraphic circuit, a main line wire an inductorium and a relay or other receiving instrument located in such main line wire and at the same station together with a distributer, in combination with a balancing coil or coils on such relay, the secondary coil of such inductorium contained in a shunt circuit formed on the main line around such inductorium normally open but having a separate branch for each contact of such distributer, each of such branches also normally open but containing and closed only through contacts on or controlled by any suitable transmitter, the energizing circuit of such balancing coil or coils also containing contacts located on or controlled by such transmitter, the primary circuit of such inductorium closed at every other contact and opened at every intermediate contact of such distributer, whereby positive and negative induced currents are sent to line alternating at the successive contacts of such distributer.

12. In a telegraphic circuit a main line wire an inductorium and a relay or other receiving instrument located in such main line wire and at the same station together with a distributer, in combination with a balancing coil or coils on such relay the source or sources of electric energy energizing such balancing coil or coils contained in a shunt circuit normally open but having a separate branch for each contact of such distributer, each of such branches also normally open but containing and closed only through contacts on or controlled by any suitable transmitter, the energizing circuit of such balancing coil or coils also containing contacts located on or controlled by such transmitter, the primary circuit of such inductorium closed at every other contact and opened at every intermediate contact of such distributer, whereby positive and negative induced currents are sent to line alternating at the successive contacts of such distributer.

13. In combination in a telegraphic circuit the following elements viz. at any station in such circuit a distributer, and means for sending to line, alternating at the successive contacts thereof, direct and inverse induced impulses and means for balancing upon a home relay, at such station, the effect of such outgoing induced impulses.

14. In combination in a telegraphic circuit the following elements viz., at any one station in such circuit a home relay a distributer and means for sending to line alternating at the successive contacts thereof direct and inverse induced impulses or currents and means for maintaining such home relay neutral to such outgoing impulses or circuits.

15. In combination with a system of simultaneous dual transmission between any two stations, and means for sending to line alternating direct and inverse impulses at points of time synchronous with the contacts made by a distributer at one of such stations, a synchronizing distributer at the other one of such stations having its contacts each in a separate electric circuit or branch circuit together with a receiving instrument, each of such circuits or branch circuits also containing therein the contacts of a single main line relay common to all such circuits or branch circuits and contained in such above mentioned system of simultaneous dual transmission.

16. In combination in a telegraphic circuit the following elements viz. at any station in such circuit, a distributer and means for sending to line, alternating at the successive contacts thereof, direct and inverse induced impulses, means for balancing upon a home relay, at such station, the effect of such outgoing induced impulses, and means for shunting from the main line any one or more of such direct or inverse induced impulses during each revolution of such distributer.

17. In combination in a telegraphic circuit the following elements viz. at any station in such circuit a home or receiving relay arranged to respond only to impulses from a distant station, a distributer and means for sending to line alternating at successive contacts thereof direct and inverse induced impulses or currents and means for shunting from the main line any one or more of such direct or inverse induced impulses or currents during each revolution of such distributer.

18. In combination in a telegraphic circuit the following elements viz. at any station in such circuit means for sending to line alternating direct and inverse induced impulses and means for preventing the action upon a home relay, at such station, of such outgoing impulses and means for shunting from the main line any one or more of such direct or inverse induced impulses.

19. In combination in a telegraphic circuit the following elements, viz. at any one station in such circuit, means for sending to line, alternating with each other, direct and inverse induced impulses, means for balancing upon a home relay, at such station, the effect of such outgoing induced impulses and means for shunting from the main line any one or more of such direct or inverse induced impulses.

20. A transmitting distributer and source of direct and inverse induced impulses or currents and a home relay having a balancing coil thereon in circuit with a source of electric energy.

21. A transmitting distributer and source of alternating direct and inverse induced impulses or currents and a home relay having a balancing coil thereon in circuit with such source of induced impulses or currents.

22. A transmitting distributer and source of alternating direct and inverse induced impulses or currents and a home relay having a balancing coil thereon in circuit with a source of electric energy.

23. In a telegraphic circuit, an inductorium having its secondary coil in the main line and its primary together with a transmitter and a balancing coil on a home relay in circuit with a source of electric energy.

24. In a telegraphic circuit, at any one station a home relay and a coil for transmission by induction located in the main line, such relay having thereon a balancing coil in a circuit controlled from such source of induction.

25. A receiving relay in a main line and a receiving instrument at the same station and a distributer between such relay and such receiving instrument.

26. In combination with means for charging a main line at regular intervals of time, a distributer at a receiving station on such line, making contacts synchronously with the charges on such main line, such distributer located between a relay in the main line and any suitable receiving instrument or instruments.

27. In combination with means for charging a main line at regular intervals of time and a distributer capable of imparting impulses to any suitable receiving instrument or instruments at points of time synchronous with the charges on the main line, a relay in such main line at any station and a receiving instrument or instruments at the same station, such distributer located between such relay and such receiving instrument or instruments.

28. In combination with means for charging a main line at regular intervals of time, a receiving relay located in such main line, the contacts of such relay placed in circuit with a source of electric energy together with a distributer making contacts synchronously with the charges on the main line and a special local relay or receiving-magnet for each contact made by such distributer, each of such relays or receiving magnets and corresponding contact in such distributer located in a separate branch of such above named source of electric energy.

29. Two stations connected by a main line, at one station a distributer and means for charging the main line at intervals of time synchronously with the contacts made by the distributer at that station, at the other station a relay permanently located in the main line and having its contacts, by the revolution of a distributer also at this station, placed successively in each of several local circuits or branch circuits, one for each division or contact of such distributer, each of such local circuits or branch circuits also containing a receiving instrument.

30. In combination, means for charging a main line at regular intervals of time, a receiving relay located in such main line, the contacts of such relay placed in circuit with a source of electric energy together with a distributer making contacts synchronously with the charges on the main line and a special local relay for each contact made by such distributer, each of such relays and its corresponding contact in such distributer located in a branch of such above named source of electric energy, and a series of corresponding receiving magnets each located in a separate shunt circuit of a source of electric energy, each such shunt circuit normally closed and containing contacts on or controlled by its corresponding relay and also contacts controlled by the receiving magnet therein contained, whereby, by the energizing of each relay its corresponding receiving magnet is caused to be energized and when thus energized to permanently open into the main energizing circuit the shunt circuit in which its energizing coil is located and means for opening such main energizing circuit at the completion of each revolution of such distributer.

31. In combination with a series of relays a series of corresponding receiving magnets each located in a shunt circuit of a source of electric energy, each such shunt circuit normally closed and containing contacts controlled by its corresponding relay and also contacts controlled by the receiving magnet therein contained, whereby by the energizing of each relay, its corresponding receiving magnet is caused to be energized and when thus energized to permanently open, into the main energizing circuit, the shunt circuit in which its energizing coil is placed.

32. A series of receiving or relay magnets and means for energizing the same in different combinations thereof taking a certain fixed number, less than the whole thereof, at a time, all of such receiving or relay magnets in each combination being energized together in common during some portion of the period of time set off for the energizing of each combination, in combination with a source of electric energy having a series of branch circuits, and in each branch circuit a registering or printing magnet and such a certain fixed number of relay contacts as shall correspond to and be actuated by the energizing of some one of such above named combinations of receiving or relay magnets.

33. A series of receiving or relay magnets and means for energizing the same in different combinations thereof taking a certain fixed number, less than the whole thereof, at a time all of such receiving or relay magnets in each combination being energized together in common during some portion of the period of time set off for the energizing of each combination, in combination with a series of printing or registering magnets, each one located in circuit with a source of electric energy together with such a certain fixed number of relay contacts as shall correspond to and be actuated by the energizing of some one of such above named combinations of such receiving or relay magnets.

34. A series of electric circuits or branch circuits each containing a different coil or instrument to be acted upon and also containing and closed through a different combination of relay contacts.

35. A series of receiving or relay magnets and means for energizing the same in different combinations thereof taking a certain fixed number, less than the whole thereof, at a time, in combination with a series of printing or registering magnets, each one located in circuit with a source of electric energy together with such a certain fixed number of relay contacts as shall correspond to and be actuated by the energizing of some one of such above named combinations of such receiving or relay magnets.

WM. H. COOLEY.

Witnesses:
AARON MILLER,
E. M. KNIFFEN.